United States Patent
Ramakrishnan et al.

(10) Patent No.: US 11,544,080 B2
(45) Date of Patent: Jan. 3, 2023

(54) ADAPTIVE USER INTERFACE BASED ON DEVICE CONTEXT AS WELL AS USER CONTEXT

(71) Applicant: MICRO FOCUS LLC, Santa Clara, CA (US)

(72) Inventors: Krishna Mahadevan Ramakrishnan, Bangalore (IN); Sumit Kumar, Bangalore (IN); Dipankaj Medhi, Bangalore (IN); Shileen Upadhyay, Bangalore (IN); Shiva Prakash S M, Bangalore (IN)

(73) Assignee: MICRO FOCUS LLC, Santa Clara, CA (US)

(*) Notice: Subject to any disclaimer, the term of this patent is extended or adjusted under 35 U.S.C. 154(b) by 479 days.

(21) Appl. No.: 16/663,972

(22) Filed: Oct. 25, 2019

(65) Prior Publication Data
US 2021/0124597 A1    Apr. 29, 2021

(51) Int. Cl.
G06F 9/451    (2018.01)
G06N 5/02    (2006.01)
G06F 9/48    (2006.01)
G06F 9/445    (2018.01)

(52) U.S. Cl.
CPC ............ *G06F 9/451* (2018.02); *G06F 9/4451* (2013.01); *G06F 9/4843* (2013.01); *G06N 5/02* (2013.01)

(58) Field of Classification Search
CPC ...... G06F 9/451; G06F 9/4451; G06F 9/4843; G06N 5/02
See application file for complete search history.

(56) References Cited

U.S. PATENT DOCUMENTS

| | | | |
|---|---|---|---|
| 9,378,467 B1 | 6/2016 | Chaiyochlarb et al. | |
| 9,448,962 B2 | 9/2016 | Sharon et al. | |
| 9,461,972 B1 | 10/2016 | Mehta | |
| 10,917,520 B1* | 2/2021 | T. G | H04M 3/5233 |
| 11,138,518 B1* | 10/2021 | Yu | G06F 9/44526 |
| 2010/0332496 A1* | 12/2010 | Horvitz | G06Q 30/02 707/723 |

(Continued)

OTHER PUBLICATIONS

Hartmann, M., "Context-Aware Intelligent User Interfaces for Supporting System Use", 2009 Dissertation, Darmstadt University of Technology, pp. 1-185.

(Continued)

*Primary Examiner* — Jennifer N Welch
*Assistant Examiner* — Reji Kartholy
(74) *Attorney, Agent, or Firm* — Michael Dryja (57) ABSTRACT

A device context of a device is identified based on device data including a current state of the device, and a user context of a user is identified based on user data including user interaction with a user interface for the device. A current task that the user is performing on the device in relation to the current state of the device is identified, and knowledge regarding how the user is performing the current task using the user interface is extracted, using an artificial intelligence technique with respect to the identified device context and the identified user context. The extracted knowledge for the identified current task is stored within a knowledge base, and can be used to adapt the user interface for another user performing the current task on the device in the current state.

20 Claims, 5 Drawing Sheets

(56) References Cited

U.S. PATENT DOCUMENTS

| | | | | |
|---|---|---|---|---|
| 2013/0117652 | A1* | 5/2013 | Folsom | G06F 40/174 |
| | | | | 715/222 |
| 2013/0304905 | A1* | 11/2013 | Appachiappan | H04L 41/5032 |
| | | | | 709/224 |
| 2016/0259840 | A1 | 9/2016 | Zheng et al. | |
| 2018/0349793 | A1 | 12/2018 | Triolo et al. | |
| 2020/0005088 | A1* | 1/2020 | Joy | G16H 40/63 |
| 2020/0209013 | A1* | 7/2020 | Kornev | G01C 21/3682 |
| 2020/0259767 | A1* | 8/2020 | Walters | H04L 51/046 |
| 2021/0042357 | A1* | 2/2021 | Wang | G06F 16/958 |

OTHER PUBLICATIONS

Feng, et al. "Intelligent Context-Aware and Adaptive Interface for Mobile LBS", Hindawi, Computational Intelligence and Neuroscience 2015, Article ID 489793, 10 pp.

Eck, et al., "Intelligent User Interfaces with Adaptive Knowledge Assistants", CSW Technical Reports, Univ. of Nebraska, 2009.

Andrew, P., "Understanding the Potential of Adaptive User Interfaces", speckyboy.com, Feb. 5, 2018, 11 pp.

Bisgaard, J. et al., "How is Context and Context-awareness Defined and Applied? A Survey . . . ", Aalborg Univ., Jan. 2004, available at www.researchgate.com/publication/249886301.

* cited by examiner

ADAPTIVE USER INTERFACE BASED ON DEVICE CONTEXT AS WELL AS USER CONTEXT

BACKGROUND

Enterprise and other types of computing environments, such as cloud computing environments, can include large numbers of diverse devices. Examples of such devices include computing devices like servers, networking devices such as routers, firewalls, and switches, and imaging devices like printers and scanners, among other types of devices. The devices of a computing environment can together support or host applications for execution on the behalf of the organization maintaining the environment, or on the behalf of its customers. Ensuring that the devices are properly running is important to ensure that the applications themselves are available as needed.

DETAILED DESCRIPTION

As noted in the background, computing environments can include large numbers of different types of devices. To ensure that the devices are properly running, administrators may have to periodically perform tasks on the devices. The tasks can include resolving an outstanding issue of a device, such as the device not performing as expected, as well as acquiring information from a device to perform root cause analysis as to why a device is experiencing the outstanding issue. The tasks can include configuring a device that may not otherwise have an outstanding issue, but which is being repurposed for a different usage, for instance.

Performing a task on a device can involve accessing a user interface of the device itself. Different tasks usually require accessing different user interface elements in different orders. Such elements can include different screens, dialog boxes, controls like dropdown menus, buttons, and text boxes, and so on. Additionally, a given task may be able to be performed in a variety of different ways. For example, the user interface element at which a device setting can be changed may be accessible from the current user interface element by selecting a menu item in a dropdown menu, as well as by clicking a button on a current screen, or in another manner.

Owing to the great diversity in devices and the disparate user interfaces by which they are accessible, a given administrator may therefore not be familiar with how to perform a given task on a given device. The administrator may have to consult a manual for the device, or online help. However, the manual or online help may not provide the specific order through the specific user interface elements of the device's user interface for the administrator to follow to perform the given task. Even if it does, the prescribed order through the prescribed user interface elements may not conform to how the administrator is accustomed to interacting with the user interface for the device, which can impede successful completion of the task.

Techniques described herein ameliorate these and other issues. Knowledge as to how to perform tasks on devices using their user interfaces is learned as users interact with the user interfaces in performing the tasks. This knowledge is then used to adapt the user interfaces presented to other users performing the tasks. Such knowledge can include user interface content as to the user interface elements that are to be accessed to perform a task, as well as user interfacing routing indicating an order in which the user elements are to be accessed to perform the task.

To both learn and use knowledge regarding user interface adaptation, both a device context of a device and a user context of a user may be identified. The device context may be considered as the device's current circumstances and environment as well as other attributes of the device, whereas the user context may similarly be considered as the user's current circumstances and environment as well as other attributes of the user. That is, context can be considered as information that is used to characterize the situation of a device (in the case of device context) or user (in the case of user context).

From such context, the task that the user is performing on the device via the device's user interface may be explicitly or implicitly identified. In the case of learning, knowledge as to how to perform the task on the device using this user interface can be accordingly extracted using an artificial intelligence technique and stored within a knowledge base. In the case of adaptation of the user interface for performing the task on the device, the knowledge can be accordingly retrieved from the knowledge base and applied using the artificial intelligence technique.

Figure 1:
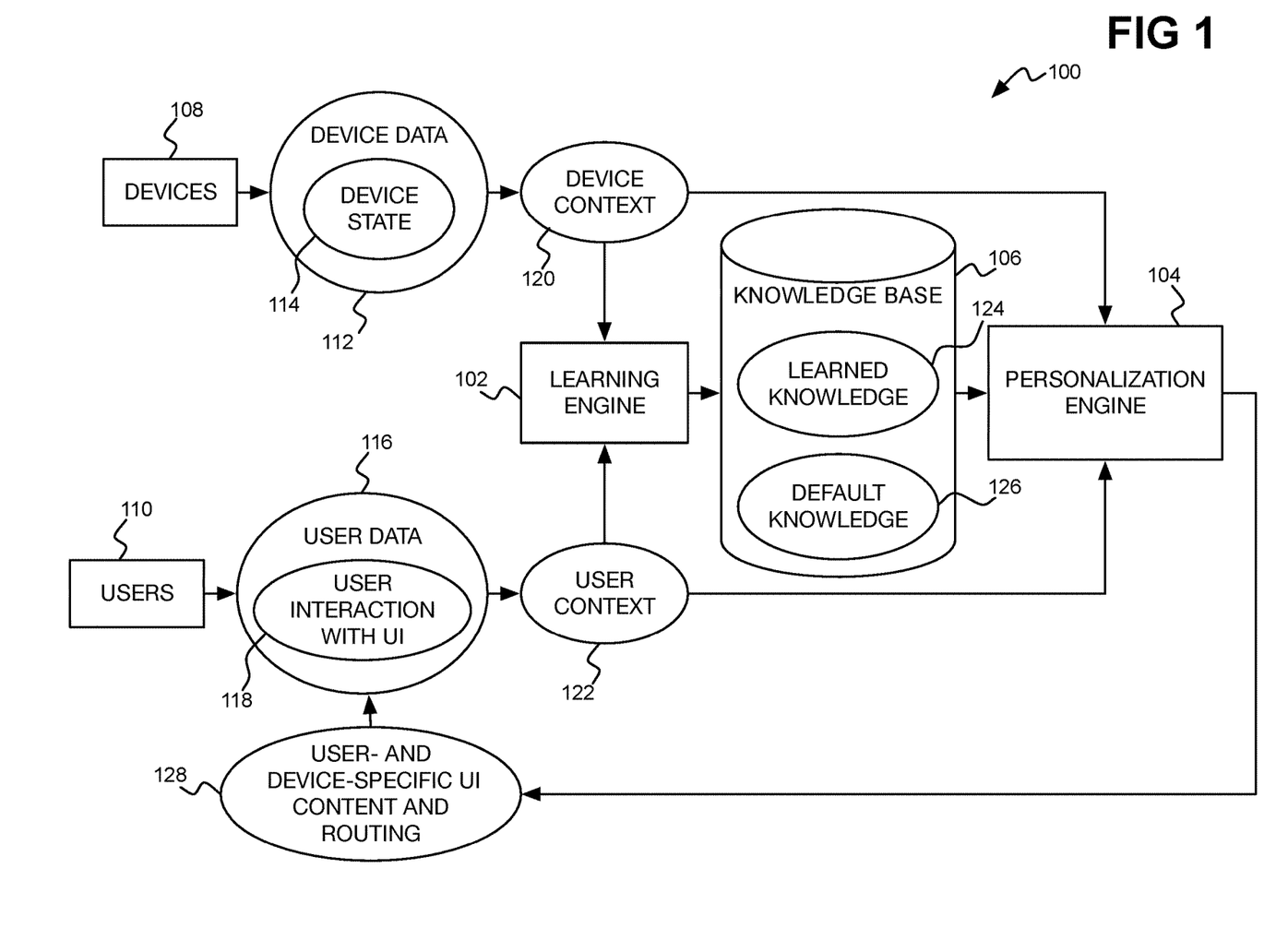
FIG. 1 is a diagram of an example architecture for continuously learning how to adapt a user interface based on device context and user context, and for subsequently adapting such a user interface based on device context and user context.

FIG. 1 shows an example architecture 100. The architecture 100 includes a learning engine 102 and a personalization engine 104 that respectively learn how to adapt user interfaces based on device context and user context, and then adapt such user interfaces based on device context and user context. The engines 102 and 104 may be implemented as program code stored on a non-transitory computer-readable data storage medium and executable by a processor.

The architecture 100 further includes a knowledge base 106. The learning and personalization engines 102 and 104 access the knowledge base 106 to respectively store and retrieve how to adapt user interfaces based on device context and user context. The knowledge base 106 may be implemented as a database stored on a storage device like a hard disk drive, solid-state drive (SSD), or other type of storage device.

The architecture 100 pertains to devices 108 and users 110. The devices 108 can disparate devices of an enterprise or other computing environment, such as servers, networking devices, imaging devices, as well as other types of hardware devices. Furthermore, insofar as applications run on the devices 108, the applications themselves may be conceptualized as devices. The users 110 may be administrators or other users tasked with ensuring that the devices 108 are properly running.

The devices 108 generate device data 112, or the device data 112 can be otherwise collected from or about the devices 108. The device data 112 includes data indicating the current operational status, current configuration, and other attributes and information regarding the devices 108. In this respect, the device data 112 can include the current state 114 of each device 108, which may be a subset of all the available device data 112 indicative of the current state 114 of the device 108 in question.

The users 110 likewise generate user data 116, or the user data 116 can be otherwise collected from or about the users 110. The user data 116 includes data indicating the users' current actions in relation to the devices 108, the users' profiles or roles with respect to the devices 108, and other attributes and information regarding the users 110. In this respect, the user data 116 for a user 110 can include user interaction 118 with the user interface of a device 108, which may be considered as the user 110's current behavior with respect to the device 108 in question.

The device context 120 of a device 108 can be assessed or identified from the device data 112, independent of the user data 116. As noted above, the device context 120 of a device 108 is information that characterizes the device 108's current situation. For instance, the device context 120 may indicate that a device 108 is experiencing a problem, has a current configuration, and so on.

The user context 122 of a user 110 can similarly be assessed or identified from the user data 116, independent of the device data 112. However, insofar as the user data 116 includes user interaction 118 with a device 108, the user context 122 is in this respect dependent on the device 108 itself. As noted above, the user context 122 of a user 110 is information that characterizes the user 110's current situation.

For instance, the user context 122 may reflect that a user 110 is attempting to perform a task on a device 108 via the user interface of the device 108. The task may be a task of a group of tasks. For example, one task of the group of tasks may be that the user 110 is trying to reconfigure the device 108 in the case in which the device 108 is not experiencing an outstanding issue as indicated by or otherwise reflected within the device 108's device context 120. Another task of the group of tasks may be that the user 110 is trying to resolve a problem with the device 108 in the case in which the device 108 is currently experiencing such an outstanding issue as indicated by or otherwise reflected within the device 108's context 120. A third task of the group of tasks may be that the user 110 is trying to obtain information to assist in performing a root cause analysis as to an outstanding issue that the device 108 or another device is currently experiencing.

The learning engine 102 can explicitly identify the current task that a user 110 is performing on the device 108 in relation to the device's current state 114, based on the device 108's device context 102 and the user's user context 122. The learning engine 102 then extracts knowledge regarding how the user 110 is performing the identified task via the user interface of the device 108, and stores this knowledge as learned knowledge 124 within the knowledge base 106. The learning engine 102 can use an artificial intelligence technique to both identify the current task and extract the knowledge, such as a pattern recognition, machine learning, or statistical technique.

The learned knowledge 124 stored in the knowledge base 106 includes user interface content as to the user interface elements that the user 110 accessed to perform the identified current task on the device 108. The learned knowledge 124 also includes user interface routing indicating the order in which the user accessed these user interface elements to perform the current task. Because the learning engine 102 employs an artificial intelligence technique, this learned knowledge 124 can be continuously refined and updated each time the task is performed.

The knowledge base 106 can also store default knowledge 126 for tasks that can be performed on the device 108. The default knowledge 126 may similarly include user interface content as to the user interface elements that a user 110 should access to perform a task on the device 108, and user interface routing indicating the order in which these elements should be accessed to perform the task. The default knowledge 126 may also assist in task identification before sufficient learned knowledge 124 has been stored in the knowledge base 106 to identify a given task with particularity.

The personalization engine 104 can also identify the current task that a user 110 is performing on a device 108 in relation to the device's current state 114, based on the device's device context 120 and the user's user context 122. Rather than extracting knowledge regarding how the user 110 is performing the identified task, however, the personalization engine 104 can retrieve previously learned knowledge 124 (or default knowledge 126) from the knowledge base 106. This knowledge 124 can include knowledge previously learned from other users. The personalization engine 104 can both identify the current task and retrieve the learned knowledge 124 using the same artificial technique that the learning engine 102 employs.

The personalization engine 104, like the learning engine 102, may explicitly identify the task that a user 110 is performing on a device 108, and then retrieve the learned knowledge 124 directly on the basis of the task that has been identified. The personalization engine 104, however, may instead be considered as implicitly identifying the task when retrieving the learned knowledge 124. For instance, the engine 104 may retrieve the learned knowledge 124 based directly on the device context 120 and the user context 122, without the intermediate step of explicitly identifying the task. The task is still identified, however, insofar the device and user contexts 120 and 122 collectively identify the task.

The personalization engine 104 therefore presents user interface content and routing 128 of the retrieved learned knowledge 124 for a user 110 performing the task on the device 110 that is specific to the user 110 and the device 108. That is, the personalization engine 104 adapts the user interface for the device 108 to the user 110 on the basis of the retrieved learned knowledge 124. The personalization engine 104 presents the user interface content of this learned knowledge 124 to the user 110 in the order indicated within the learned knowledge 124, on which basis further user data 116 is generated when the user 110 again interacts with the user interface of the device 108.

The architecture 100 thus can continuously learn how users 110 perform tasks on the devices 108, via the learning engine 102, and continuously adapt the user interfaces for the devices 108 presented to the users 110, via the personalization engine 104. As more efficient or convenient ways to perform a task are learned, the adaptation of the user interfaces likewise evolves. The personalization engine 104, for instance, may select user interface content and routing 128 for a task from retrieved learned knowledge 124 for a similar task. The engine 104 may select content and routing 128 for a task on a device 108 from retrieved learned knowledge 124 for the same or similar task on a similar device 108. The engine 104 may select content and routing 128 for a task to present to a user 110 from retrieved learned knowledge 124 for the same or different task as performed by a similar user 110.

For example, the device context 120 identified from the device data 112 of a device 108 may indicate the device 108 is experiencing a certain problem. The user context 122 identified from the user data 116 for a user 110 may reflect that the user 110 is attempting to resolve this problem. The personalization engine 104 may in effect determine that other users 110 have interacted with the user interface of the device 108 (or a similar device 108) in a similar fashion as the user 110 in question is interacting with the user interface. Therefore, the personalization engine 104 retrieves the learned knowledge 124 as to how such users 110 resolved the issue in the past on the same or similar devices 108, and accordingly adapts the user interface content and routing 128 for the user 110 currently attempting to perform the task.

It is noted that the content and routing 128 that the personalization engine 104 selects may differ for different users. For example, the learning engine 102 may learn multiple ways to perform a particular task. The personalization engine 104 may select one way to perform the task for one user, and another way to perform the task for another user. Such selection may be based on different types of devices that the users are using to perform the task, the roles of the users, and so on. A user may further override the content and route 128 that the personalization engine 104 selects for the user.

As the user 110 then engages with the user interface to resolve the problem on the device 108, the learning engine 102 monitors such resolution via the changing device context 120 and user context 122. If the user 110 veers from the suggested user interface content and routing 128, the learning engine 102 may refine the learned knowledge 124 for the task in question to reflect such mutation. Over time, various ways to perform tasks of varying similarity on devices 108 having degrees of similarity by users 110 also having differing degrees are learned. More-favored approaches are learned by reinforcement, whereas less-favored approaches are discarded by user lack of adherence to such approaches in performing the tasks.

The architecture 100 thus adapts a user interface for a device 108 in consideration of both the user 110 interacting with the user interface and the device 108 on which a task is being performed. The device context 120 of the device 108 is reflected in this user interface adaptation along with the user context 122 of the user 110. That is, user interface adaptation occurs not just on the basis of user context 122, but also on the basis of device context 120. This permits the personalization engine 104 to better adapt the user interface for a device 108 with which a user 110 interacts to perform a task.

User interface adaptation that does not consider the device context 120 may not be able to adapt the user interface as well. For instance, failure to consider device context 120 can make it more difficult to identify the current task that a user 110 is attempting to perform on a device 108, as compared to an artificial intelligence technique that considers device data 112 generated by other, like devices 108 when such tasks are performed on them. Not taking into account device context 120 can make it more difficult for the learning engine 102 to learn knowledge 124 that can be suitably used by the personalization engine 104 as to how to perform tasks as the devices 108 change over time as reflected within the device data 112.

Figure 2:
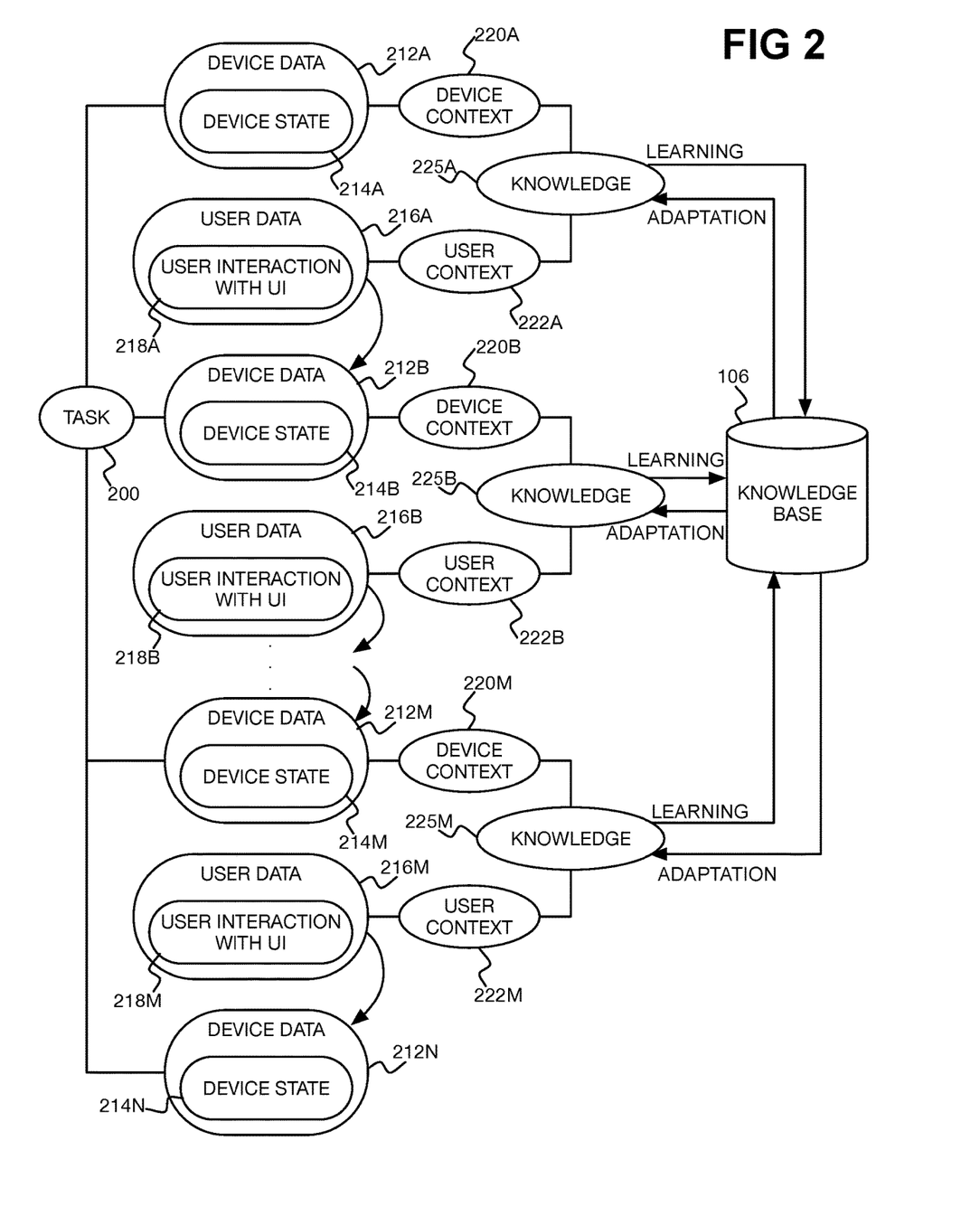
FIG. 2 is a diagram of an example as to how device state can change over multiple iterations of user interaction with a user interface of a device in performing a task, during learning and usage of user interface adaptation knowledge in the architecture of FIG. 1.

FIG. 2 shows an example as to how device state can change over multiple iterations of user interaction with a user interface of a device in performing a task 200, during learning and usage of user interface adaptation knowledge. Device data 212A, 212B, . . . , 212M, 212N correspond to the device's device data over consecutive iterations to complete the task 200, and which are collectively referred to as the device data 212. The device data 212A, 212B, . . . , 212M, 212N respectively include device states 214A, 214B, . . . , 214M, 214N, which correspond to the device's current state as it changes over the iterations, and which are collectively referred to as the device states 214.

User data 216A, 216B, . . . , 216M are collectively referred to as the user data 216. The user data 216 correspond to the user's user data over consecutive iterations. The user data 216A, 216B, . . . , 216M respectively include user interactions 218A, 218B, . . . , 218M, which correspond to the user's interaction with the device's user interface over the iterations, and which are collectively referred to as the user interactions 218.

In each iteration of device data 212 and user data 216, the user interacts with the device's user interface, per the user interaction 218, with the device in the device state 214. The change in a setting of the device resulting from the user interaction 216 causes the device to advance to the next iteration in which the device is in the device state 214 per the device data 212 of this new iteration. The user interacts with the user interface, per the user interaction 218 of this iteration, and the resulting change in device setting causes the device to advance to the next iteration. This process continues until the task 200 has been completed, with the device in the device state 214N per the device data 212N.

For instance, from the first iteration in which the device is in the state 214A, the performed user interaction 218A advances the device to the state 214B of the next iteration. The user interaction 218B is performed with the device in this state 214B, which advances the device to the state 214 of the following iteration. This processed is repeated, until the iteration in which the last user interaction 218M is performed with the device in the device state 214M. The device then advances to the state 214N, completing performance of the task 200.

The definition of the task 200 may thus be considered as the user interactions 218 with the user interface of the device that causes the device to advance from the device state 214A to the device state 214N. The number of interim states 214B . . . 214M over which the device transitions between the initial state 214A and the final state 214M can vary depending on the task 200 being performed. Indeed, there may be no such interim states 214B . . . 214N, such that performing the user interaction 218A with the device in the state 214A causes the device to enter the state 214N corresponding to completion of the task 200.

Device contexts 220A, 220B, . . . , 220M respectively correspond to device data 212A, 212B, . . . , 212M, and are collectively referred to as the device contexts 220. User contexts 222A, 222B, . . . , 222M likewise respectively correspond to user data 216A, 216B, . . . , 216M, and are collectively referred to as the user contexts 222. The device context 220 at each iteration is identified from its corresponding device data 212, and the user context 222 at each iteration is identified from its corresponding user data 216.

Knowledge 225A, 225B, . . . , 225M is collectively referred to as the knowledge 225. At each iteration, the knowledge 225 is determined from the device context 220 and the user context 222 of that iteration. In the case in which learning is being performed, the knowledge 225 is extracted based on, or from, the contexts 220 and 222, and stored in the knowledge base 106 for the task 200. The knowledge 225 may not be stored in finalized form until the final device state 214N has been reached, which is when the task 200 may be identifiable with most certainty.

In the case in which user interface adaptation is being performed, the knowledge 225 is retrieved from the knowledge base 106, based on the device context 220 and the user context 222. The knowledge 225 may be retrieved at each iteration, based on the task 200 that has been identified with most confidence based on, or from, the contexts 220 and 222 of the iterations that have thus far occurred. In this case, the task 200 that is identified may change as iterations occur, until a sufficient number of iterations have occurred for the task 200 to be identified with certainty. The task 200 may not be identified, such that user interface adaptation does not occur until a sufficient number of iterations have occurred for the task 200 to be identified with a confidence level greater than a specified threshold.

Figure 3:
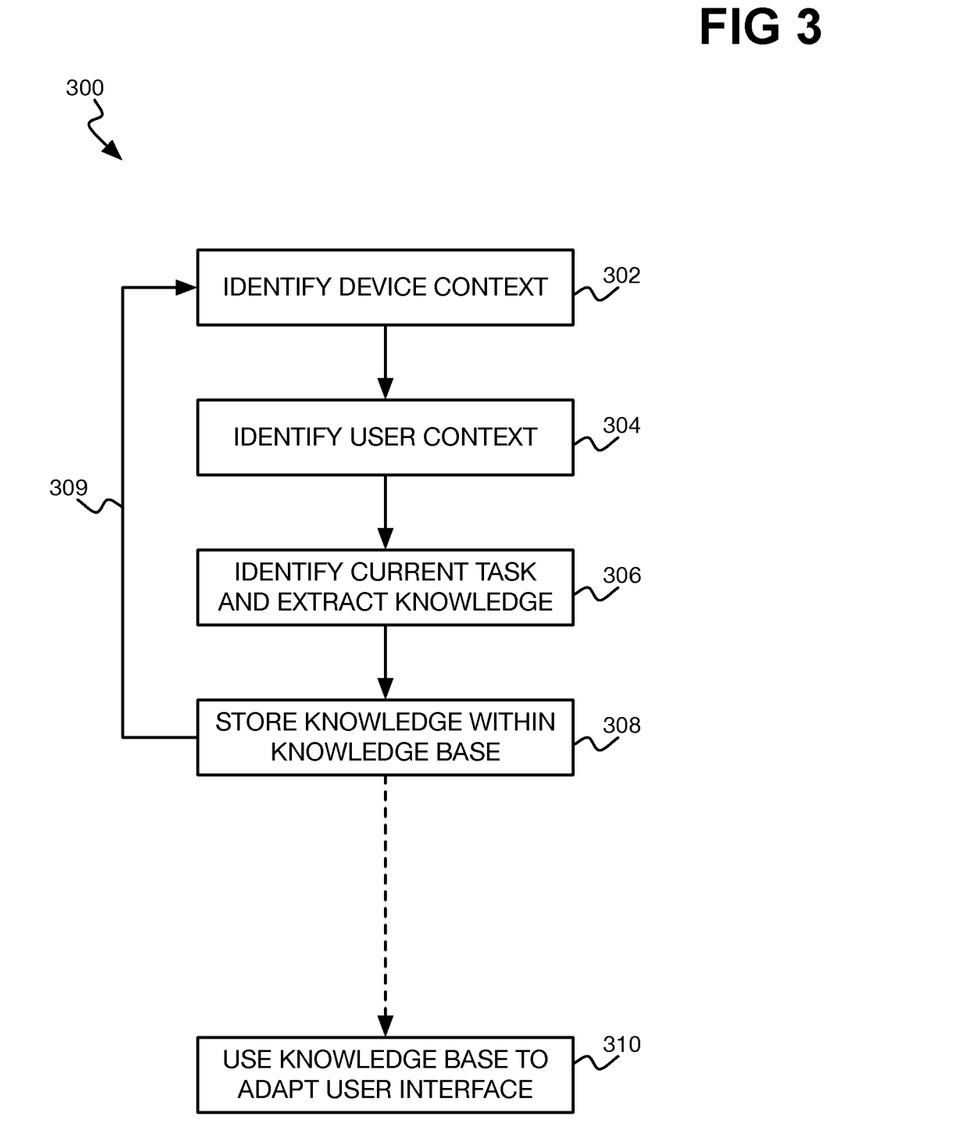
FIG. 3 is a flowchart of an example method for learning how to adapt a user interface of a device to perform a task while a user interacts with the user interface.

FIG. 3 shows an example method 300 for learning how to adapt a user interface of a device to perform a task while a user interacts with the user interface. The method 300 can be implemented as program code stored on a non-transitory computer-readable data storage medium. A processor can execute the code to perform the method 300.

In the method 300, the device context of a device is identified from device data that includes the current state of the device (302). For example, a multidimensional device vector corresponding to the device context may be populated from the device data. In such an implementation, the device data that represents the current context of the device may be predetermined, with each dimension of the vector corresponding to different device data. In another implementation, the device data that represents the current context of the device may be refined over time, such as in a machine learning or other manner.

The user context of a user is similarly identified from user data that includes user interaction with a user interface for the device (304). For example, a multidimensional user vector corresponding to the user context may be populated from the user data. As with the device context, the user data that represents the current context of the user may be predetermined, with each dimension of the vector corresponding to different user data, and in another implementation may be refined over time using a machine learning or other technique.

The current task that the user is performing on the device in relation to the device's current state is identified, and knowledge regarding how the user is performing the current task using the user interface is extracted (306). The extracted knowledge for the identified task is stored within a knowledge base (308). The method 300 is then repeated at part 302, per the arrow 309, until the task has been completed. Task identification and knowledge extraction can be performed using an artificial intelligence technique with respect to, or based on, the identified device and user contexts. Task identification can be explicitly performed during learning, since the extracted knowledge may be referenced by the identified task when stored within the knowledge base.

For example, the current task may be identified by selecting a prespecified task that most closely matches the device and user contexts. However, finalized task identification during learning, as is the case in the method 300, may not have to occur until task completion. Therefore, the current task can be specified as the current state of the device after the user interaction occurs (i.e., the final device state) as compared to or in relation to the current state of the device before the user interaction occurred (i.e., the initial device state).

In this implementation, for instance, as the user performs the current task on the device to advance the current state of the device from an initial state to a final state, knowledge as to how the user is performing the task is extracted and stored. Once the task has been completed, as may be signified by the user no longer interacting with the user interface of the device, the task may be defined based on the final and initial states of the device. The knowledge that has been extracted and stored can then be associated with this now-finalized identified task within the knowledge base.

Insofar as a task is being performed that may have been performed previously, however, as the user interacts with the user interface of the device to advance the current state of the device from one state to another state, identification of the task may be able to be performed by analyzing the device and user contexts as they change over the course of the user interaction. The device and user contexts can be matched to their counterparts for tasks previously performed and for which knowledge is already stored in the knowledge base at corresponding points during task completion. In this way, the knowledge stored in the knowledge base for a task can be refined and updated over time, as different users perform the task on different devices in different ways. Similarity of task execution is identifiable, in other words, based on user and device context similarity. The usage of an artificial intelligence technique like machine learning permits such task identification and knowledge refinement and updating to be achieved.

The extracted knowledge that is stored includes user interface content as to the user interface elements that the user is accessing to perform the current task, and user interface routing as to the order in which the user is accessing these elements to perform the task. The knowledge can thus specify the user interaction that advances the current state of the device from its initial state (i.e., before user interaction began) to its final state (i.e., when user interaction finished). Each time the user performs a user interaction, the user interaction can be stored along with the state of the device.

The user interaction can be gleaned from the user context, because the user context is based on user data that represents the user interaction with the user interface of the device. The state of the device can be gleaned from the device context, because the device context is based on device data that includes the current device state. Both the device and user contexts can be stored each time the user performs a user interaction, so that subsequent device and user contexts can be matched to adapt the user interface when using the stored knowledge, such as for task identification purposes as has been described.

Each time the user performs a user interaction, then, the user interface elements that the user accessed during this user interaction can be stored as part of the extracted knowledge. The order in which the user performs the interactions is the user interface routing that is also stored as part of the extracted knowledge. The extracted knowledge thus can specify the sequence of user interactions that are performed to complete the current task, where the user interactions themselves are the elements of the user interface for the device that the user accessed.

Once the task has been completed by the user, the extracted knowledge stored within the knowledge base can be used to adapt the user interface for the same or different user performing the same or similar task on the same or similar device in the same or similar initial device state (310). For example, the knowledge base can be used to adapt the user interface for another user performing the current task on the device, based on the knowledge for the current task stored in the knowledge base. Usage of the knowledge base can occur using the same artificial technique employed during learning. That is, identifying the current task and retrieving knowledge for the task from the knowledge base can be performed using the same artificial technique that the method 300 employed during learning.

Figure 4:
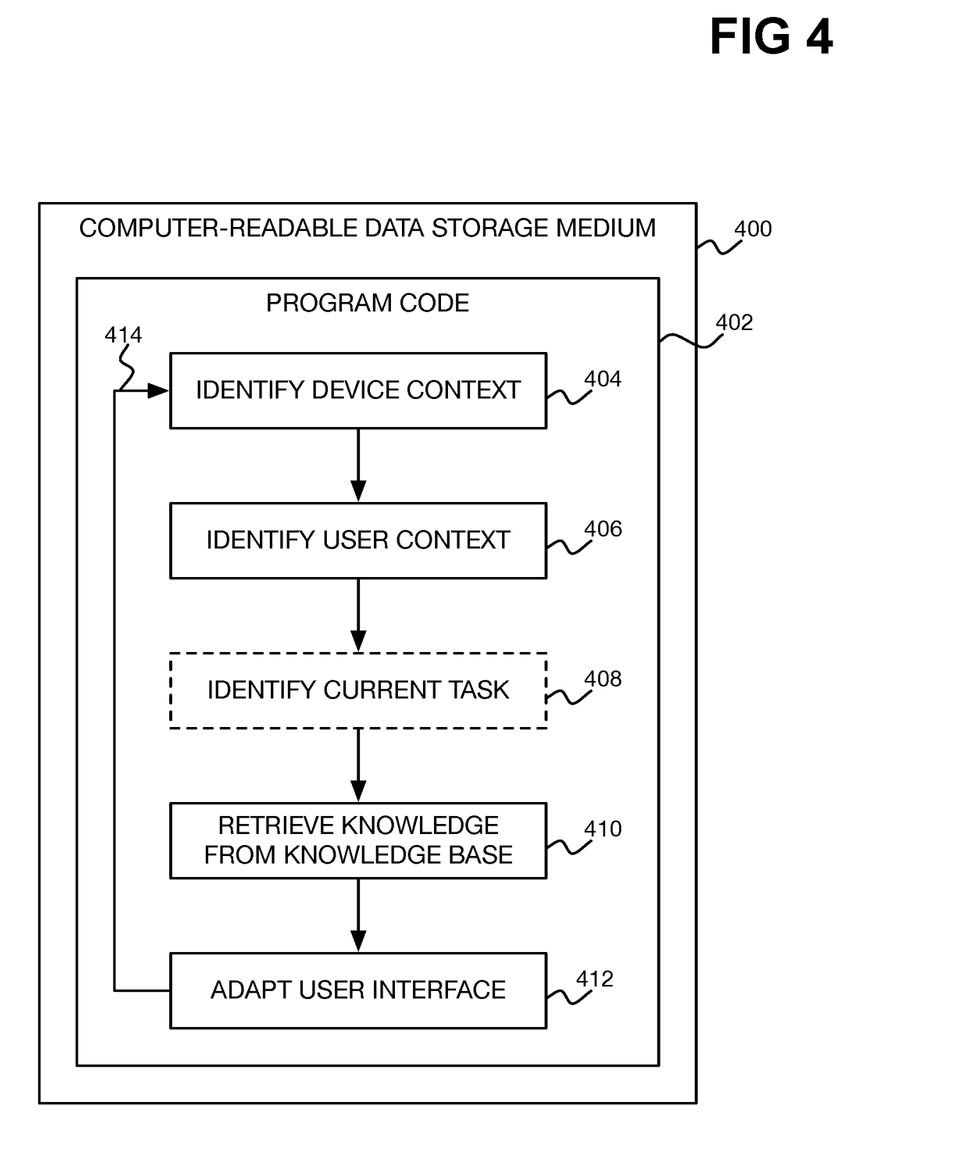
FIG. 4 is a diagram of an example non-transitory computer-readable data storage medium for adapting a user interface of a device to perform a task while a user interacts with the user interface.

FIG. 4 shows an example non-transitory computer-readable data storage medium 400 for adapting a user interface of a device to perform a task while a user interacts with the user interface. The computer-readable data storage medium 400 stores program code 402 that is executable by a processor to perform processing. The processor that executes the program code 402 may be the same or different processor (i.e., which is a part of the same or different computing device) that executes program code to perform the method 300.

The device context of a device is identified from device data that includes the current state of the device (404), and the user context of a user is identified from user data that includes user interaction with a user interface for the device (406). The device and user contexts can be identified in the same manner as has been described in relation to FIG. 3. For instance, multidimensional device and user vectors can be respectively populated for the device and user contexts from the user device and user data.

The current task that the user is performing on the device in relation to the device's current state can be identified (408), and knowledge for how to perform the current task using the user interface for the device can be retrieved from the knowledge base (410). The user interface for the device can then be adapted for the user performing the current task, based on the retrieved knowledge (412). The processing can then be repeated at part 402, per the arrow 414, until the task has been completed. As in learning, task identification and knowledge extraction can be performed using an artificial intelligence technique with respect to, or based on, the identified device and user contexts.

However, during user interface adaptation, task identification may be explicit or implicit, which is why part 408 is indicated using dashed lines in FIG. 4. If task identification is explicit, then the task may be identified in a similar manner as has been described in relation to learning. For instance, the current task may be identified by selecting a prespecified task that most closely matches the device and user contexts that have been determined thus far since the user began interacting with the user interface of the device. Unlike in learning, however, task identification cannot wait until task completion, since the purpose of user interface adaptation is to adapt the user interface for the user as he or she is performing the task via the user interface of the device.

As another example, the device and user contexts can be matched to their counterparts for tasks previously performed and for which knowledge is stored in the knowledge base at corresponding points during task completion. For example, when a user first starts interacting with the user interface of a device, the most likely task the user is performing on the device via the device's user interface may be determined from the initial device and user contexts. If the task is identified with a confidence greater than a threshold, then user interface adaptation may occur.

As the user continues to interact with the user interface, additional device and user contexts are determined, on which basis the task can be identified with increasing confidence. The user interface may start being adapted once the task is identified with a confidence greater than a threshold. However, if the user is attempting to perform a different task, at some point the misidentified task will no longer be determined with sufficient confidence to continue adapting the user interface. In all likelihood the correct task will be identified at some point, at which time user interface adaptation can resume for the correctly identified task.

If the task is explicitly identified, then the knowledge may be retrieved from the knowledge base directly on the basis of the identified task. However, the task may be implicitly identified instead of explicitly identified. Implicit task identification means in this respect that the knowledge is directly retrieved from the knowledge base on the basis of the determined device and user contexts that have been identified so far. Since task identification itself also occurs on the basis of device and user contexts, and/or since the knowledge base stores knowledge as referenced by the tasks, knowledge retrieval on the basis of device and user context means that the task is still identified in this case, albeit implicitly.

For example, for which knowledge is stored in the knowledge base and that have corresponding device and user contexts at corresponding points during task completion and which match the device and user contexts determined thus far may be identified. More specifically, the task for which knowledge is stored in the knowledge basis and that has device and user contexts most closely matching the device and user contexts determined thus far may be identified. If this task's device and user contexts match with a confidence greater than a threshold, then knowledge for the task may be retrieved from the knowledge base and task adaptation resultantly occur.

As the user interacts with the user interface for the device, the device and user contexts matching continues against the corresponding contexts of tasks for which knowledge is stored in the database. If the user is not performing the task on which basis user interface adaptation is being performed, at some point the device and user contexts will no longer match the task for which retrieved knowledge is governing user interface adaptation. User interface adaptation will then cease until, as the user continues to interact with the device's user interface, the device and users contexts match the correct task for which knowledge is stored in the knowledge base. This knowledge will be retrieved, and user interface adaptation restarted.

As noted above, the retrieved knowledge includes user interface content as to the user interface elements that the user is to access to perform the current task, as well as user interface routing that indicates the order in which the user is to access the user interface elements to perform the current task. The user interface is thus adapted by presenting these user interface elements to the user in the indicated order, for the user to perform in relation to the device in the current state. That is, the user interface is dynamically adapted as the user progresses through the presented user interface elements in the indicated order and as the current state of the device resultantly changes.

For example, the retrieved knowledge can indicate with which user interface element the user should interact next to continue to perform the currently identified task. The user interface is adapted in that this user interface element is presented or highlighted to the user for interaction to change a setting of the device. This process continues until the user has finished interacting with the user interface, and has completed a task.

The user interface may be adapted based on the retrieved knowledge in other ways as well. For example, a given setting of a device that has to be changed to perform the task may be able to be changed using a variety of different user interface elements. In performing past tasks, the user may have favored certain types of user interface elements, such as dropdown menus, over other types of user interface elements, such as buttons, which may be reflected in the user context. Therefore, if the retrieved knowledge for the task identifies that a given user element is to be accessed to change a particular device setting, the user interface may be adapted for the user by instead presenting a different user interface element for changing the same device setting if the user previously favored the type of the latter element. That is, learning can occur as to a user's navigation patterns with user interfaces of devices. As such, user interface adaptation for a user can be performed based on the learned navigation patterns of the user.

The user interface may be adapted based on the user context in other ways as well. For example, the user context may indicate that the user is a particular type of user, or has a particular role within the organization in question. How user interaction within the user interface occurs may be based on the user's type or role. Task identification may be similarly based on user context in this manner.

The user interface may further be adapted based on the device for which the task is being performed, as well as based on the task itself. For instance, there may not be knowledge stored in the knowledge base for performing the task, but there may be stored knowledge for similar tasks. Likewise, there may not be knowledge stored in the database for performing the same or similar task on the device, but there may be such stored knowledge for similar devices. Knowledge can thus be retrieved for similar tasks and/or for similar devices, with the user interface for the device on which the user is performing the task correspondingly adapted. The usage of an artificial intelligence technique like machine learning permits these and other types of user interface adaptation to be achieved.

Figure 5:
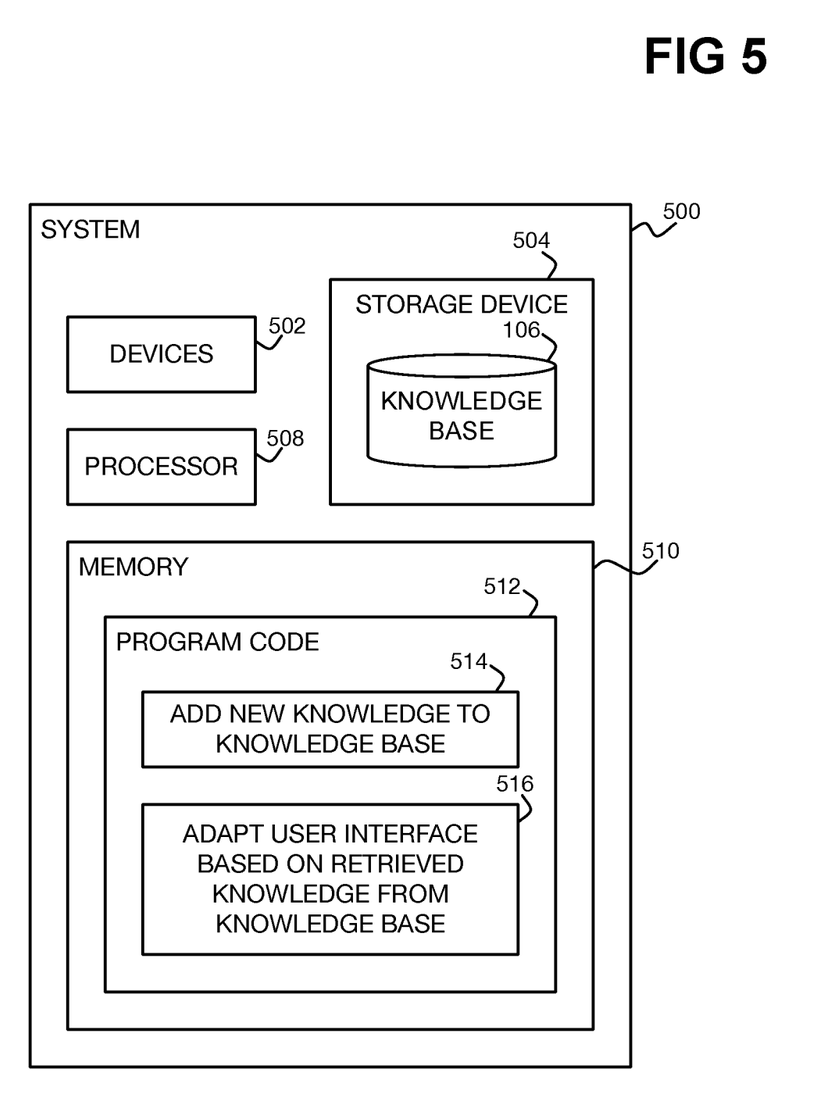
FIG. 5 is a diagram of an example system for continuously learning how to adapt user interfaces of devices and then adapting the user interfaces.

FIG. 5 shows an example system 500 for continuously learning how to adapt user interfaces of devices and then adapting the user interfaces. The system 500 includes devices 502 in relation to which users are to perform tasks via user interfaces. The system 500 includes a storage device 504, such as a non-volatile storage device like a magnetic media- or solid state-type storage device. The storage device 504 stores the knowledge base 106 of knowledge as to how to perform the tasks.

The system 500 includes a processor 508 and a memory 510 storing program code 512 that is executable by the processor 508 to perform processing. The processing includes adding new knowledge to the knowledge base 106 as to tasks that users perform on the devices 502 via their user interfaces, using an artificial intelligence technique based on identified device and user contexts (514). For example, the processor 508 may perform the method 300 of FIG. 3 that has been described.

The processing further includes adapting the user interfaces of the devices based on retrieved knowledge from the knowledge base 106 for tasks that the users are performing on the devices 502 via their user interfaces (516). For example, the processor 508 may perform the processing of FIG. 4 that has been described. The processing can be continuously performed, so that new knowledge is continuously added to the database and the user interfaces for the devices continuously adapted as the users perform tasks on the devices via their user interfaces.

The techniques that have been described improve how tasks are performed on devices via their user interfaces. Using an artificial technique to learn how users perform tasks on the devices and subsequently to adapt the user interfaces by which the users perform the tasks can permit users less familiar with certain types of tasks or devices to nevertheless complete the tasks on the devices more efficiently. Learning and adaptation occur on the basis of device context as well as user context in this respect.

We claim:

1. A method comprising:
    identifying a device context of a device based on device data including a current state of the device as having an outstanding issue that is to be resolved, comprising:
        populating a multidimensional device vector corresponding to the device context from the device data, the multidimensional device vector having a plurality of different dimensions corresponding to different device data;
    identifying a user context of a user based on user data including user interaction with a user interface of the device to modify the device in relation to the outstanding issue, comprising:
        populating a multidimensional user vector corresponding to the user context from the user data, the multidimensional user vector having a plurality of different dimensions corresponding to different user data;
    explicitly identifying a current task that the user is performing on the device to modify the device in relation to the current state and in relation to the outstanding issue, and extracting knowledge regarding how the user is performing the current task using the user interface, using an artificial intelligence technique with respect to the identified device context and the identified user context;
    storing the extracted knowledge for the identified current task within a knowledge base; and
    using the knowledge base to adapt the user interface for another user performing the current task on the device in the current state of the device, based on the extracted knowledge for the current task stored in the knowledge base,
    wherein the multidimensional device and user vectors are different vectors.

2. The method of claim 1, wherein explicitly identifying the current task comprises explicitly selecting a prespecified task that most closely matches the device context and the user context.

3. The method of claim 1, wherein explicitly identifying the current task comprises specifying the current task as the current state of the device after the user interaction occurs in relation to the current state of the device before the user interaction occurs.

4. The method of claim 1, wherein the current task that the user is performing comprises issue resolution of the outstanding issue of the device in the current state as reflected within the device context.

5. The method of claim 1, wherein the extracted knowledge regarding how the user is performing the current task using the user interface comprises user interface content as to user interface elements that the user is accessing to perform the current task and user interface routing indicating an order in which the user is accessing the user interface elements to perform the current task.

6. The method of claim 5, wherein extracting the knowledge comprises specifying the extracted knowledge as the user interaction to advance the current state of the device from before the user interaction started to after the user interaction was completed.

7. The method of claim 5, wherein the knowledge base further stores default user interface knowledge comprising default user interface content as to default user interface elements that are accessible to perform the current task and default user interface routing indicating a default order in which the default user interface elements are accessed to perform the current task.

8. A non-transitory computer-readable data storage medium storing program code executable by a processor to perform processing comprising:
- identifying a device context of a device based on device data including a current state of the device as having an outstanding issue that is to be resolved, comprising:
  - populating a multidimensional device vector corresponding to the device context from the device data, the multidimensional device vector having a plurality of different dimensions corresponding to different device data;
- identifying a user context of a user based on user data including user interaction with a user interface of the device to modify the device in relation to the outstanding issue of the device, comprising:
  - populating a multidimensional user vector different than the multidimensional device vector, the multidimensional user vector having a plurality of different dimensions corresponding to different user data;
- explicitly identifying a current task that the user is performing on the device to modify the device in relation to the current state of the device and in relation to the outstanding issue of the device, using an artificial technique with respect to the identified device context and the identified user context;
- retrieving knowledge for the identified current task from a knowledge base as to how to perform the current task using the interface, using the artificial technique with respect to the identified current task; and
- adapting the user interface of the device, based on the knowledge for the current task retrieved from the knowledge base,
- wherein the multidimensional device and user vectors are different vectors.

9. The non-transitory computer-readable data storage medium of claim 8, wherein explicitly identifying the current task comprises selecting a prespecified task that most closely matches the device context and the user context.

10. The non-transitory computer-readable data storage medium of claim 8, wherein the current task that the user is performing comprises issue resolution of the outstanding issue of the device in the current state as reflected within the device context.

11. The non-transitory computer-readable data storage medium of claim 8, wherein the knowledge as to how to perform the current task using the user interface comprises user interface content as to user interface elements that the user is to access to perform the current task and user interface routing indicating an order in which the user is to access the user interface elements to perform the current task.

12. The non-transitory computer-readable data storage medium of claim 11, wherein adapting the user interface of the device comprises presenting the user interface elements to the user in the indicated order for the user to perform in relation to the current state of the device.

13. The non-transitory computer-readable data storage medium of claim 12, wherein the user interface is dynamically adapted as the user progresses through the presented user interface elements in the indicated order and as the current state of the device resultantly changes.

14. The non-transitory computer-readable data storage medium of claim 11, wherein the knowledge base further stores default user interface knowledge comprising default user interface content as to default user interface elements that are accessible to perform the current task and default user interface routing indicating a default order in which the default user interface elements are accessed to perform the current task.

15. A system comprising:
- a storage device storing a knowledge base of knowledge for a plurality of tasks as to how to perform the tasks in relation to a plurality of devices via user interfaces for the devices;
- a processor; and
- a memory storing program code and executable by the processor to:
  - add new knowledge to the knowledge base as to a first task that a first user performed on a first device via a user interface of the first device, using an artificial intelligence technique with respect to an identified device context of the first device and an identified user context of the first user, the artificial intelligence technique explicitly identifying the first task that the user is currently performing on the first device to modify the first device in relation to an outstanding issue that is to be resolved, the identified device context of the first device including a current state of the first device as having the outstanding issue; and
  - adapt a user interface of a second device, based on retrieved knowledge from the knowledge base for a second task that a second user is performing on the second device via the user interface of the second device, using the artificial intelligence technique with respect to an identified device context of the second device and an identified user context of the second user, the artificial intelligence technique explicitly identifying the second task that the user is currently performing on the first device to modify the second device in relation to an outstanding issue that is to be resolved, the identified device context of the second device including a current state of the second device as having the outstanding issue,
- wherein the identified device context of the first device comprises a first multidimensional device vector populated from first device data including the current state of the first device as having the outstanding issue, the first multidimensional device vector having a plurality of different dimensions corresponding to different device data,
- wherein the identified user context of the first user comprises a first multidimensional user vector populated from first user data including first user interaction with a user interface of the first device to modify the first device in relation to the outstanding issue, the first multidimensional user vector having a plurality of different dimensions corresponding to different user data,
- and wherein the first multidimensional device and user vectors are different vectors.

16. The system of claim 15, wherein the program code is executable by the processor to continuously add the new knowledge to the knowledge base and to continuously adapt the user interfaces for the devices, as the users perform the tasks via the user interfaces for the devices.

17. The system of claim 15, wherein the knowledge base further stores default user interface knowledge comprising default user interface content as to default user interface elements that are accessible to perform the second task and default user interface routing indicating a default order in which the default user interface elements are accessed to perform the second task.

18. The system of claim 15, wherein the artificial intelligence technique explicitly identifies the first task by selecting a prespecified task that most closely matches the identified device context of the first device and the identified user context of the first user.

19. The system of claim 15, wherein the artificial intelligence technique explicitly identifies the second task by selecting a prespecified task that most closely matches the identified device context of the second device and the identified second context of the first user.

20. The system of claim 15, wherein the identified device context of the second device comprises a second multidimensional device vector populated from second device data including the current state of the second device as having the outstanding issue, the second multidimensional device vector having the plurality of different dimensions corresponding to the different device data, and wherein the identified user context of the second user comprises a second multidimensional user vector different than the second multidimensional device vector and populated from second user data including second user interaction with a user interface of the second device to modify the second device in relation to the outstanding issue, the second multidimensional user vector having the plurality different dimensions corresponding to the different user data.

* * * * *